United States Patent
Duan et al.

(10) Patent No.: US 7,247,598 B2
(45) Date of Patent: Jul. 24, 2007

(54) NANO-SCALE MAGNETIC SOLID BASE CATALYST AND ITS PREPARATION METHOD

(75) Inventors: Xue Duan, Beijing (CN); Hui Zhang, Beijing (CN); Rong Qi, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 11/040,408

(22) Filed: Jan. 21, 2005

(65) Prior Publication Data

US 2005/0130838 A1    Jun. 16, 2005

Related U.S. Application Data

(63) Continuation-in-part of application No. PCT/CN03/00592, filed on Jul. 23, 2003.

(30) Foreign Application Priority Data

Jul. 23, 2002    (CN) ................ 02 1 25589

(51) Int. Cl.
    *B01J 23/00*    (2006.01)
(52) U.S. Cl. ............ 502/315; 502/325; 502/326; 502/327; 502/328; 502/329; 502/330; 502/331; 502/332; 502/335; 502/336; 502/337; 502/338; 502/340; 502/341; 502/342; 502/355; 502/524
(58) Field of Classification Search .......... 502/524, 502/305–307, 313–315, 319, 325–332, 335–338, 502/340–342, 355
See application file for complete search history.

(56) References Cited

U.S. PATENT DOCUMENTS

| | | | | |
|---|---|---|---|---|
| 3,577,354 | A | * | 5/1971 | Kehl .................. 502/306 |
| 3,595,810 | A | * | 7/1971 | Kehl .................. 502/307 |
| 3,666,684 | A | * | 5/1972 | Koslosky, Jr. .......... 502/35 |
| 3,670,042 | A | * | 6/1972 | Croce et al. ........... 585/618 |
| 3,751,512 | A | * | 8/1973 | Woskow et al. ........ 585/625 |
| 3,843,745 | A | * | 10/1974 | Christman et al. ...... 585/625 |
| 4,220,560 | A | * | 9/1980 | Anquetil et al. ........ 502/306 |
| 4,537,867 | A | * | 8/1985 | Fiato et al. ............ 502/74 |
| 4,604,375 | A | * | 8/1986 | Soled et al. ........... 502/241 |
| 4,607,020 | A | * | 8/1986 | Soled et al. ........... 502/177 |
| 4,889,615 | A | | 12/1989 | Chin et al. |
| 5,093,301 | A | * | 3/1992 | Chu et al. ............. 502/303 |
| 6,046,130 | A | * | 4/2000 | Narbeshuber et al. .... 502/340 |
| 6,218,335 | B1 | * | 4/2001 | Okada et al. .......... 502/340 |
| 6,395,244 | B1 | * | 5/2002 | Hartweg et al. ....... 423/239.1 |
| 6,524,996 | B1 | * | 2/2003 | Bender et al. ......... 502/346 |

FOREIGN PATENT DOCUMENTS

| | | |
|---|---|---|
| CN | 1200959 | 12/1998 |
| CN | 1201714 | 12/1998 |
| CN | 1315255 | 10/2001 |
| EP | 1005905 | 6/2000 |
| WO | WO 9946039 | 9/1999 |

OTHER PUBLICATIONS

PCT, International Search Report dated Nov. 13, 2004.

* cited by examiner

*Primary Examiner*—Cam N. Nguyen
(74) *Attorney, Agent, or Firm*—Ohlandt, Greeley, Ruggiero & Perle L.L.P.

(57) ABSTRACT

This invention describes a nano-scale magnetic solid base catalyst and its preparation method. The catalyst involves a magnetic core coated with a solid base active layer. The synthesis of the nano-scale magnetic cores was first carried out using a rapid nucleation method in a colloid mill reactor using a liquid-liquid reaction. The nano-scale magnetic cores were mixed with a mixed salt solution. The LDH-containing magnetic cores were prepared in a colloid mill reactor by a rapid nucleation method, and subsequently calcined to give a solid base mixed oxides coated on magnetic cores. The characteristics of this catalyst are: nano-scale, high surface area and high activity and selectivity in base-catalyzed reactions. The highly dispersed catalyst can be easily reclaimed using an external magnetic field because of its magnetism. The catalyst can be utilized in base catalysis in organic reactions such as glycol ether synthesis, ester exchange, aldol condensation, etc.

3 Claims, No Drawings

NANO-SCALE MAGNETIC SOLID BASE CATALYST AND ITS PREPARATION METHOD

CROSS REFERENCE TO RELATED PATENT APPLICATIONS

This application is a Continuation-in-Part (CIP) of International PCT Application Number PCT/CN03/00592 filed on Jul. 23, 2003, which claimed the benefit of prior Patent Application No. 02125589.X of the People's Republic of China, which was filed on Jul. 23, 2002.

TECHNICAL FIELD

This invention describes nano-scale magnetic solid base catalysts and a method for their preparation.

BACKGROUND OF THE INVENTION

Current trends in catalysis research include the gradual replacement of homogeneous catalysts by heterogeneous catalysts. The advantages of using a solid base catalyst instead of a liquid base in catalytic reactions are:

(1) The high catalytic activity and selectivity and high purity of product;

(2) The catalysts can be easily separated;

(3) Preventing corrosion of equipment, reduction in effluent and more environmentally friendly.

However, heterogeneous catalysis systems usually have several shortcomings such as smaller reaction interface area and bigger transmission resistance, etc. These shortcomings significantly reduce the catalytic activity compared with homogeneous catalysis systems. There are also other reasons which limit the extensive application of heterogeneous catalysis systems.

Layered double hydroxides (LDHs) are a promising prospect in the field of heterogeneous catalysis. Shape-selective catalytic properties can be introduced by controlling the particle size and distribution and by adjusting the porosity. Nano-scale mixed metal oxides that have small particle size and large specific surface area have very efficient contact with the substrate, and give rise to high catalytic activities and excellent thermal stability. The disadvantage of these catalytic systems is the poor dispersion of the liquid-solid system, as well as difficulties in separation and reclamation of the catalyst. Furthermore, the large bed resistance caused by the small size of the catalyst particles in gas-solid catalysis systems leads to difficulties in their utilization in industry.

EP0421677A1 and EP0421678A1 relate to alkaline LDHs and calcined LDHs as solid base catalysts in glycol ether synthesis. LDHs can be represented by the general formula $[M^{2+}{}_aM^{3+}{}_b(OH)_{9(2a+3b)}][X]_b$, where $M^{2+}$ and $M^{3+}$ are divalent and trivalent metal cations, respectively; X is interlayer anion. LDHs were calcined to give Mg—Al—O compounds. Both of these works have not described how to solve the problems of dispersal, separation and reclaim of the catalyst however.

SUMMARY OF THE INVENTION

This invention describes a nano-scale magnetic solid base catalyst and its preparation method. This catalyst comprises a magnetic core coated by a solid base catalyst. This catalyst can be highly dispersed and easily reclaimed by using an external magnetic field because of its magnetism. The method of synthesis of this catalyst is as follows: Firstly, the synthesis of the nano-scale magnetic cores was carried out by a rapid nucleation method in a colloid mill reactor using a liquid-liquid reaction (as shown as the patent application 00132145.5). The nano-scale magnetic cores were mixed with corresponding mixed salt solution. Then, the LDH-magnetic core composite materials were prepared in a colloid mill reactor by a rapid nucleation method, and subsequently calcined to give a solid base mixed oxide compound. The mixed oxide compound is coated on the magnetic cores.

The nano-scale magnetic solid base catalyst in this invention has the formula:

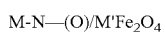

Composition(wt %):

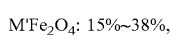

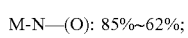

wherein,

M is a divalent metal cation selected form the group consisting of $Mg^{2+}$, $Ni^{2+}$, $Zn^{2+}$, $Ca^{2+}$ or $Co^{2+}$; N is a trivalent metal cation selected form the group consisting of $Fe^{3+}$, $V^{3+}$, $Al^{3+}$ or $Cr^{3+}$. M' is a divalent metal cation selected form the group consisting of $Mg^{2+}$, $Cu^{2+}$, $Ba^{2+}$, $Ni^{2+}$, and M' can be same as M or different;

$M'Fe_2O_4$ is a magnetic material. M-N—(O) is a composite oxide obtained $M'Fe_2O_4$ is a magnetic material. M-N—(O) is a composite oxide obtained from calcination of the corresponding LDH coated on the surface of $M'Fe_2O_4$.

Preparation Method of the Catalyst:

(1) Preparation of Nano-scale Magnetic Core $M'Fe_2O_4$

The mixed salt solution contained a soluble inorganic salt of M' (0.1-2.5 M) and a soluble $Fe^{3+}$ inorganic salt (0.2-5.0 M) with the molar ratio of $M'/Fe^{3+}$ of 0.2-5.0. The mixed alkali solution contained NaOH (0.1-5.0 M) and $Na_2CO_3$ (0.1-4.8 M).

The mixed salt and alkali solutions were simultaneously poured into a colloid mill reactor (as shown as the patent application 00132145.5). The rotation speed is 1000~8000 rpm. The solutions were mixed thoroughly in the gap between the rotor and stator for 1~8 min. The resulting slurry was transferred to an aging kettle and aged at 80~120° C. for 2~10 h. The solid product was filtered, washed, dried, and finally calcined at 800~1000° C., affording the $M'Fe_2O_4$ powder. The particle size of $M'Fe_2O_4$ is within the range 20~80 nm. The pH value of the mixed solution is adjusted in the range 8.5~11.0 by addition of an alkali solution.

(2) Synthesis of the Magnetic Precursor M-N-LDH/$M'Fe_2O_4$

The mixed salt solution contained a soluble divalent inorganic metal salt $M^{2+}(X^{n-})_{2/n}$ (0.2-2.5 M) and a soluble trivalent inorganic metal salt $N^{3+}(X^{n-})_{3/n}$ (0.2-2.5 M) with the molar ratio of $M^{2+}/N^{3+}$ in range 2~4. $M'Fe_2O_4$ powder was added to the mixed salt solution, such that the mass ratio of $M'Fe_2O_4$/divalent inorganic metal is in the range 1:17.1~5.0, and stirred vigorously. The mixed alkali solution contained NaOH (0.1~5.0 M) and $Na_2CO_3$ (0.1~4.8 M).

The salt and alkali solutions were simultaneously poured into the colloid mill reactor. The rotation speed is 1000~8000 rpm. The solutions were mixed thoroughly in the gap between the rotor and stator for 1~8 min. The resulting slurry was transferred to an aging kettle and aged at 80~120° C. for 4~10 h. The solid product was filtered, washed and dried, affording M-N-LDH/M'Fe$_2$O$_4$ containing the magnetic cores M'Fe$_2$O$_4$. The pH value of the mixed solution was adjusted by addition of alkali solution and kept in the range 8.5~11.0.

(3) Preparation of M-N—(O)/M'Fe$_2$O$_4$ Catalyst

The M-N-LDH/M'Fe$_2$O$_4$ was calcined at 400~600° C. for 2~5 h with a heating rate of 10° C./min affording the magnetic solid base catalyst M-N—(O)/M'Fe$_2$O$_4$ with a particle size of 30~100 nm.

The Fe$^{3+}$ salt in step (1) could be: Fe$_2$(SO$_4$)$_3$, FeCl$_3$ or Fe(NO$_3$)$_3$. The M' salt could be: M'SO$_4$, M'Cl$_2$ or M'(NO$_3$)$_2$. M' could be Mg$^{2+}$ or Ni$_{2+}$.

The X described in step (2) could be: Cl$^-$, SO$_4^{2-}$, NO$_3^-$ or CO$_3^{2-}$. n is the valency of the anion X, n=1 or 2.

The preparation of magnetic cores and solid base catalyst is carried out by a rapid nucleation process in the colloid mill, in which the reactants mix and react thoroughly in a very short time, followed by a separate aging process for crystal growth. The resultant products are uniformly nanoscale. In the process of preparation of M-N-LDH/M'Fe$_2$O$_4$, it ensures the uniformity of coating structure because the crystal cores grow in the same preparation environment on the surface of the magnetic core. The particle size of this catalyst is in the range 30~100 nm. Magnetic properties: coercive force: Hc=120~108 A/m, saturation magnetization $\sigma_x$=2~18 A/m. This catalyst can be highly dispersed and reclaimed by application of an external magnetic field because of its magnetism. The problems of reclaim and separation in other similar catalytic systems have been resolved.

The following examples disclosing formulas according to the present invention are illustrative only and are not intended to limit the scope of the present invention in any way.

EXAMPLE 1

(1) Preparation of Nano-Scale Magnetic Core MgFe$_2$O$_4$

The synthesis of the sample with Mg/Fe mol ratio of 1:2 was carried out as follows: one solution containing 8.46 g Mg(NO$_3$)$_2$.6H$_2$O and 27.07 g Fe(NO$_3$)$_3$.9H$_2$O in 130 ml of water and another containing 6.40 g NaOH and 14.20 g Na$_2$CO$_3$ were prepared. The two solutions were simultaneously poured into a colloid mild with the rotor rotating at 3000 rpm for 5 min. The resulting product was poured into an aging kettle and aged for 6 h with the temperature maintained at 100° C. The product was then repeatedly washed, filtered until the pH value of the washings was equal to 7, and finally dried at 70° C. for 24 h. The product was milled and calcined at 900° C. for 2 h in air. The heating rate was 10° C./min. Deionized water was used throughout all the experiments.

(2) Preparation of Magnetic Precursor MgAl-LDH/MgFe$_2$O$_4$

The synthesis of the sample with Mg/Al mol ratio of 3:1 was carried out as follows: one solution containing 38.46 g Mg(NO$_3$)$_2$.6H$_2$O, 18.78 g Al(NO$_3$)$_3$.9H$_2$O and MgFe$_2$O$_4$ in 130 ml of water with the Mg(NO$_3$)$_2$.6H$_2$O/MgFe$_2$O$_4$ mass ratio of 17.10, and another containing 6.40 g NaOH and 14.20 g Na$_2$CO$_3$ were prepared. The two solutions were simultaneously poured into a colloid mild with the rotor rotating at 3000 rpm for 5 min. The resulting product was transferred into an aging kettle and aged for 6 h with the temperature maintained at 100° C. The product was repeatedly washed, filtered until the pH value of the washings was equal to 7, and was finally dried for 24 h at 70° C. Deionized water was used throughout all the experiments.

(3) Preparation of Catalyst MgAl(O)/MgFe$_2$O$_4$

The magnetic precursor MgAl-LDH/MgFe$_2$O$_4$ was calcined at 600° C. for 2 h in air. The heating rate was 10° C./min. The particle size is in the range 30~80 nm. The optimal particle size is 62 nm. Coercive force: Hc=120 A/m, saturation magnetization $\sigma_x$=2.1 A/m.

EXAMPLE 2

(1) Preparation of Nano-Scale Magnetic Core NiFe$_2$O$_4$

The synthesis of the sample with Ni/Fe mol ratio of 1:2 was carried out as follows: one solution containing 9.60 g Ni(NO$_3$)$_2$.6H$_2$O and 27.07 g Fe(NO$_3$)$_3$.9H$_2$O in 130 ml of water and another containing 8.00 g NaOH and 14.20 g Na$_2$CO$_3$ were prepared. The two solutions were simultaneously poured into a colloid mild with the rotor rotating at 5000 rpm for 3 min. The resulting product was transferred into a kettle and aged for 6 h with the temperature maintained at 100° C. The product was repeatedly washed, filtered until the pH value of the washings was equal to 7, and was finally dried for 24 h at 70° C. The product was then milled and calcined at 900° C. for 2 h in air. The heating rate was 10° C./min. Deionized water was used throughout all the experiments.

(2) Preparation of Magnetic Precursor ZnAl-LDH/NiFe$_2$O$_4$

The synthesis of the sample with Zn/Al mol ratio 2:1 was carried out as follows: one solution containing 39.56 g Zn(NO$_3$)$_2$.6H$_2$O, 25.13 g Al(NO$_3$)$_3$.9H$_2$O and NiFe$_2$O$_4$ in 130 ml of water with the Zn(NO$_3$)$_2$.6H$_2$O/NiFe$_2$O$_4$ mass ratio of 11.40 and another containing 14.4 g NaOH and 10.6 gNa$_2$CO$_3$ were prepared. The two solutions were simultaneously poured into a colloid mild with the rotor rotating at 5000 rpm for 3 min. The resulting product was transferred into an aging kettle and aged for 6 h with the temperature maintained at 100° C. The product was repeatedly washed, filtered until the pH value of the washings was equal to 7, and was finally dried for 24 h at 70° C. Deionized water was used throughout all the experiments.

(3) Preparation of Catalyst ZnAl(O)/NiFe$_2$O$_4$

The magnetic precursor ZnAl(O)/NiFe$_2$O$_4$ was calcined at 600° C. in air for 5 h. The heating rate was 10° C./min.

The particle size is in the range 30~80 nm. The optimal particle size is 58 nm. Coercive force: Hc=110.5 A/m, saturation magnetization $\sigma_x$=3.5 A/m.

EXAMPLE 3

(1) Preparation of Nano-Scale Powder Magnetic Core NiFe$_2$O$_4$

The synthesis of the sample with Ni/Fe molar ratio of 1:2 was carried out as follows: one solution containing 9.60 g Ni(NO$_3$)$_2$.6H$_2$O and 27.07 g Fe(NO$_3$)$_3$.9H$_2$O in 130 ml of water and another containing 8.80 g NaOH and 10.65 g Na$_2$CO$_3$ were prepared. The two solutions were simultaneously poured into a colloid mild with the rotor rotating at 7000 rpm for 2 min. The resulting product was transferred to an aging kettle and aged for 6 h with the temperature maintained at 100° C. The product was repeatedly washed, filtered until the pH value of the washings was equal to 7, and was finally dried for 24 h at 70° C. The product was then milled and calcined at 900° C. in air for 2 h. The heating rate was 10° C./min. Deionized water was used throughout all the experiments.

(2) Preparation of Magnetic Precursor MgAl-LDH/NiFe$_2$O$_4$

The synthesis of the sample with Mg/Al mol ratio of 4:1 was carried out as follows: one solution containing 41.03 g Mg(NO$_3$)$_2$.6H$_2$O, 15.01 g Al(NO$_3$)$_3$.9H$_2$O and NiFe$_2$O$_4$ in 130 ml of water with the Mg(NO$_3$)$_2$.6H$_2$O/NiFe$_2$O$_4$ mass ratio of 5.00 and another containing 12.8 g NaOH and 8.48 g Na$_2$CO$_3$ were prepared. The two solutions were simultaneously poured into the colloid mild with the rotor rotating at 7000 rpm for 2 min. The resulting product was transferred into an aging kettle and aged for 6 h with the temperature maintained at 100° C. The product was repeatedly washed, filtered until the pH value of the washings was equal to 7, and was finally dried for 24 h at 70° C. Deionized water was used throughout all the experiments.

(3) Preparation of Catalyst MgAl(O)/NiFe$_2$O$_4$

The magnetic precursor MgAl-LDH/NiFe$_2$O$_4$ was calcined at 550° C. for 5 h in air. The heating rate was 10° C./min.

The particle size is in the range 35~90 nm. The optimal particle size is 65 nm. Coercive force: Hc=130.2 A/m, saturation magnetization σ$_x$=2.6 A/m.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention is not limited to the particular embodiment(s) disclosed as the best mode contemplated for carrying out this invention, but that the invention will include all embodiments falling within the scope of the claims.

What is claimed is:

1. A nano-scale magnetic solid base catalyst having the formula:

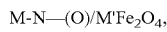
M-N—(O)/M'Fe$_2$O$_4$,

Wherein M'Fe$_2$O$_4$ is a nano-scale magnetic core, and M-N—(O) is a composite oxide obtained from calcination of a corresponding layered double hydroxides M-N-LDH, which is coated on the surface of said M'Fe$_2$O$_4$;

Wherein M is a divalent metal cation selected from the group consisting of Mg$^{2+}$, Ni$^{2+}$, Zn$^{2+}$, Ca$^{2+}$ and Co$^{2+}$; N is a trivalent metal cation selected from the group consisting of Fe$^{3+}$, V$^{3+}$, Al$^{3+}$ and Cr$^{3+}$ and M' is a divalent metal cation selected from the group consisting of Mg$^{2+}$, Cu$^{2+}$, Ba$^{2+}$, and Ni$^{2+}$, and said M' can be the same as said M or different; and wherein M'Fe$_2$O$_4$ comprises about 15 wt. % to about 38 wt. %, and M-N—(O) comprises about 62 wt. % to about 85 wt. %, of the total weight of said nano-scale magnetic solid base catalyst.

2. A method for synthesizing nano-scale magnetic solid base catalyst according to claim 1 comprising the steps of:

a) synthesizing said nano-scale magnetic core comprising the steps of:

simultaneously adding a first mixed salt solution and a mixed alkali solution to a colloid mill reactor with the rotation speed at about 1000 rpm to 8000 rpm, wherein said first mixed salt solution comprises 0.1M-2.5M soluble M' inorganic salt and 0.2-5.0M soluble Fe$^{3+}$ inorganic salt such that the molar ratio of M'/Fe$^{3+}$ is between 0.2-5.0, said mixed alkali solution comprises 0.1-5.0 M NaOH and 0.1-4.8 M Na$_2$CO$_3$, and the pH of the mixture of said first mixed salt solution and mixed alkali solution is kept in about 8.5 to 11 and adjusted by the content of said mixed alkali solution;

mixing said first mixed salt solution and said mixed alkali solution completely in the gap between the rotor and stator of said colloid mill reactor for about 1 to 8 mm, producing a slurry;

pouring said slurry into an aging kettle and aging said slurry at about 80° C. to 120° C. for 2 to 10 hours, resulting in a solid product;

filtering, washing, and drying said solid product; and calcining said solid product at 800° C. to 1000° C., producing said nano-scale magnetic cores M'Fe$^2$O$^4$ having a particle size of about 20 nm to about 80 nm;

b) synthesizing magnetic precursor M-N-LDH/M'Fe$^2$O$^4$ comprising steps of:

preparing a second mixed salt solution comprising about 0.2 M-2.5 M of a soluble divalent inorganic metal salt M$^{2+}$(X$^{n-}$)$_{2/n}$ and about 0.2M-2.5M of soluble trivalent inorganic metal salt N$^{3+}$(X$^{n-}$)$_{3/n}$ such that the molar ratio of M$^{2+}$/N$^{3+}$ is about 2 to 4, wherein n is the valence of anions X, n=1 or 2;

adding the aforementioned nano-scale magnetic cores M'Fe$_2$O$_4$ to said second mixed salt solution and stirring vigorously to produce a salts solution such that the mass ratio of M'Fe$_2$O$_4$/divalent inorganic metal ion is 1:17.1~5.0;

preparing a mixed alkali solution which comprises 0.1-5.0 M NaOH and 0.1-4.8 M Na$_2$CO$_3$;

simultaneously pouring said salts solution and said mixed alkali solution into a colloid mill reactor with the rotation speed of about 1000 to 8000 rpm, the pH of the mixture of said salts solution and mixed alkali solution is kept in about 8.5 to 11 and adjusted by the content of said mixed alkali solution;

mixing said salts solution and mixed alkali solution completely in the gap between the rotor and stator of said colloid mill reactor for about 1 to 8 mm, producing a slurry;

pouring said slurry into an aging kettle and aging said slurry at 80° C. to 120° C. for about 4 to 10 hours, resulting in a solid product;

filtering, washing repeatedly, and drying said solid product, resulting said M-N-LDH/M'Fe$_2$O$_4$ that contains said nano-scale magnetic core;

c) preparing said solid base catalyst M-N—(O)/M'Fe$_2$O$_4$ wherein said M-N-LDH/M'Fe$_2$O$_4$ is calcined at about 400° C. to 600° C. for about 2 to 5 hours at a heating rate of about 10° C./min, resulting said magnetic solid base catalyst M-N—(O)/M'Fe$_2$O$_4$ having a particle size of about 30 nm to 100 nm.

3. The method for synthesizing nano-scale magnetic solid base catalyst according to claim 2, wherein said Fe$^{3+}$ inorganic salt is selected from the group consisting of Fe$_2$(SO$_4$)$_3$, FeCl$_3$ and Fe(NO$_3$)$_3$, said M' inorganic salt is selected from the group consisting of M'SO$_4$, M'Cl$_2$ and M'(NO$_3$)$_2$; and M' is selected from the group consisting of Mg$^{2+}$ and Ni$^{2+}$; said X is selected from the ground consisting of Cl, SO$_4^{2-}$, NO$_3^-$ and CO$_3^{2-}$.

* * * * *